United States Patent

Deeg et al.

[11] 4,209,311
[45] Jun. 24, 1980

[54] FILTER FOR LARGE GAS QUANTITIES

[75] Inventors: Helmut Deeg, Sulz-Attikon; Siegmund Schulze, Winterthur, both of Switzerland

[73] Assignee: Sulzer Brothers Limited, Winterthur, Switzerland

[21] Appl. No.: 953,636

[22] Filed: Oct. 23, 1978

[30] Foreign Application Priority Data

Nov. 10, 1977 [CH] Switzerland .................. 13714/77

[51] Int. Cl.$^2$ ............................................ B01D 46/04
[52] U.S. Cl. ............................ 55/294; 55/492; 55/496; 55/499; 55/505
[58] Field of Search ............... 55/290, 294, 299, 302, 55/303, 351, 492, 496, 498, 499, 505, 528, 365, 378, 500

[56] References Cited

U.S. PATENT DOCUMENTS

| 1,321,490 | 11/1919 | Sweetland | 55/294 |
| 2,315,278 | 3/1943 | Shaw | 55/290 |
| 2,511,598 | 6/1950 | Reeves | 55/505 |
| 2,575,876 | 11/1951 | Kausch | 55/496 |
| 2,758,671 | 8/1956 | Silverman et al. | 55/294 |
| 2,788,860 | 4/1957 | Turner | 55/294 |
| 2,839,158 | 6/1958 | Reinauer | 55/294 |
| 3,083,515 | 4/1963 | Morris et al. | 55/294 |
| 3,463,675 | 12/1969 | King, Jr. | 55/290 |
| 3,499,267 | 3/1970 | King, Jr. et al. | 55/290 |
| 3,977,847 | 8/1976 | Clark | 55/302 |

FOREIGN PATENT DOCUMENTS

| 529129 | 11/1921 | France | 55/505 |
| 2354124 | 1/1978 | France | 55/378 |
| 45-42586 | 10/1970 | Japan | 55/294 |

Primary Examiner—David L. Lacey
Attorney, Agent, or Firm—Werner W. Kleeman

[57] ABSTRACT

A filter for cleaning large quantities of contaminated gas, wherein the gas to be cleaned is passed through a filter medium which is spanned onto a drum. The retained contaminants are removed by a device which wipingly passes over the filter medium. The drum is fixedly connected with a conduit or line through which there is conducted the contaminated gas. The removal device comprises a compressed gas-blast device equipped with at least one jet nozzle and movable over at least part of the outer surface of the drum surrounds the periphery of such drum. The jet nozzle is directed towards the surface of the filter medium. Means serve for the withdrawal of the separated contaminants from the internal hollow space or compartment of the drum.

1 Claim, 8 Drawing Figures

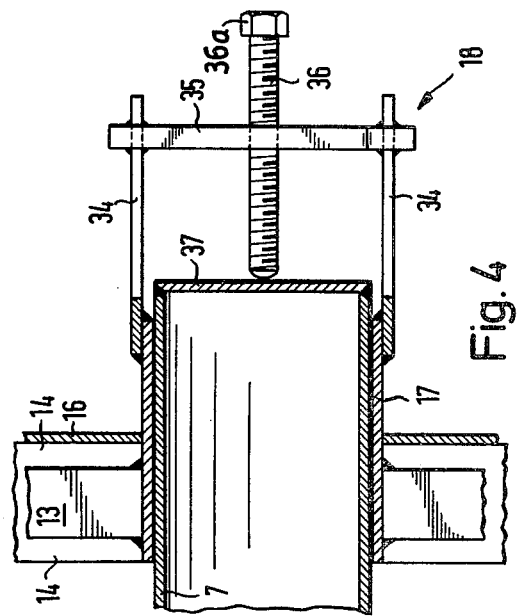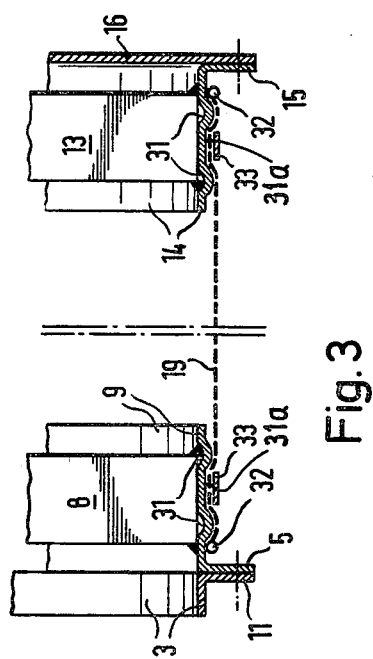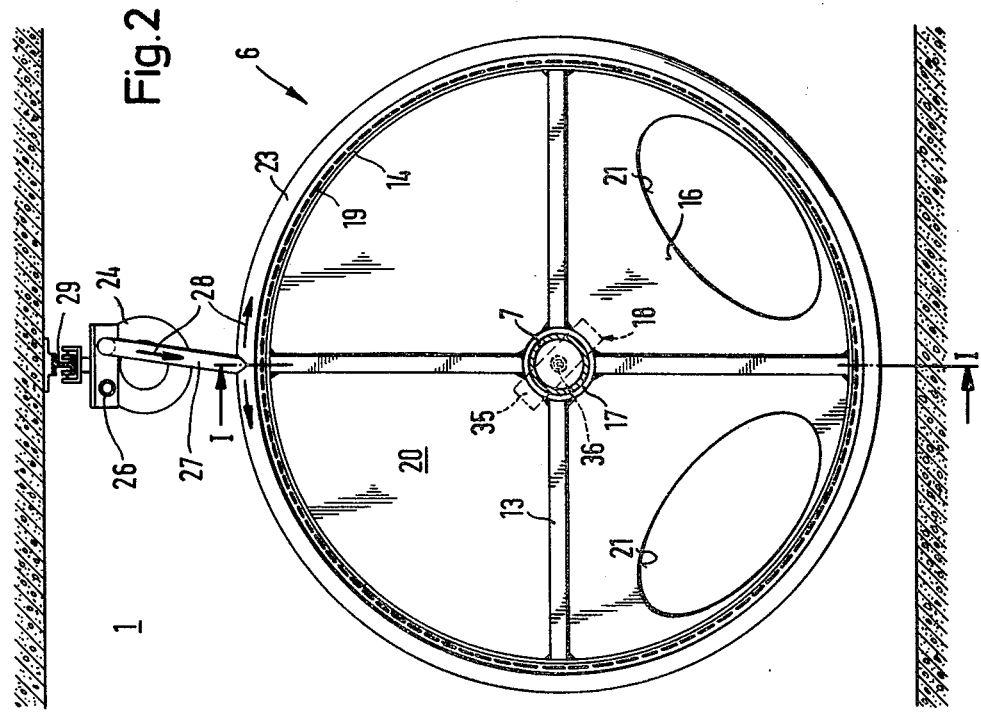

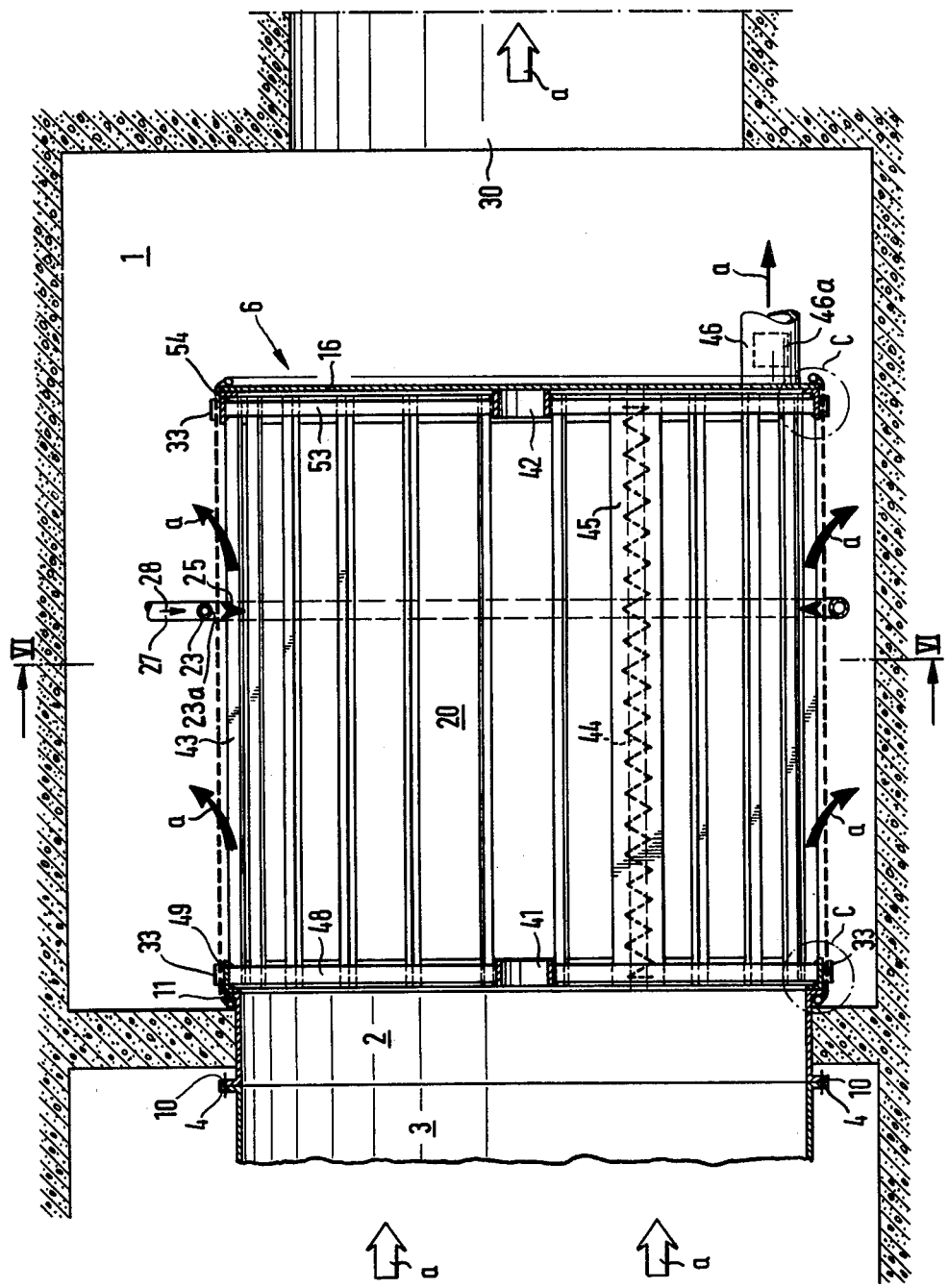

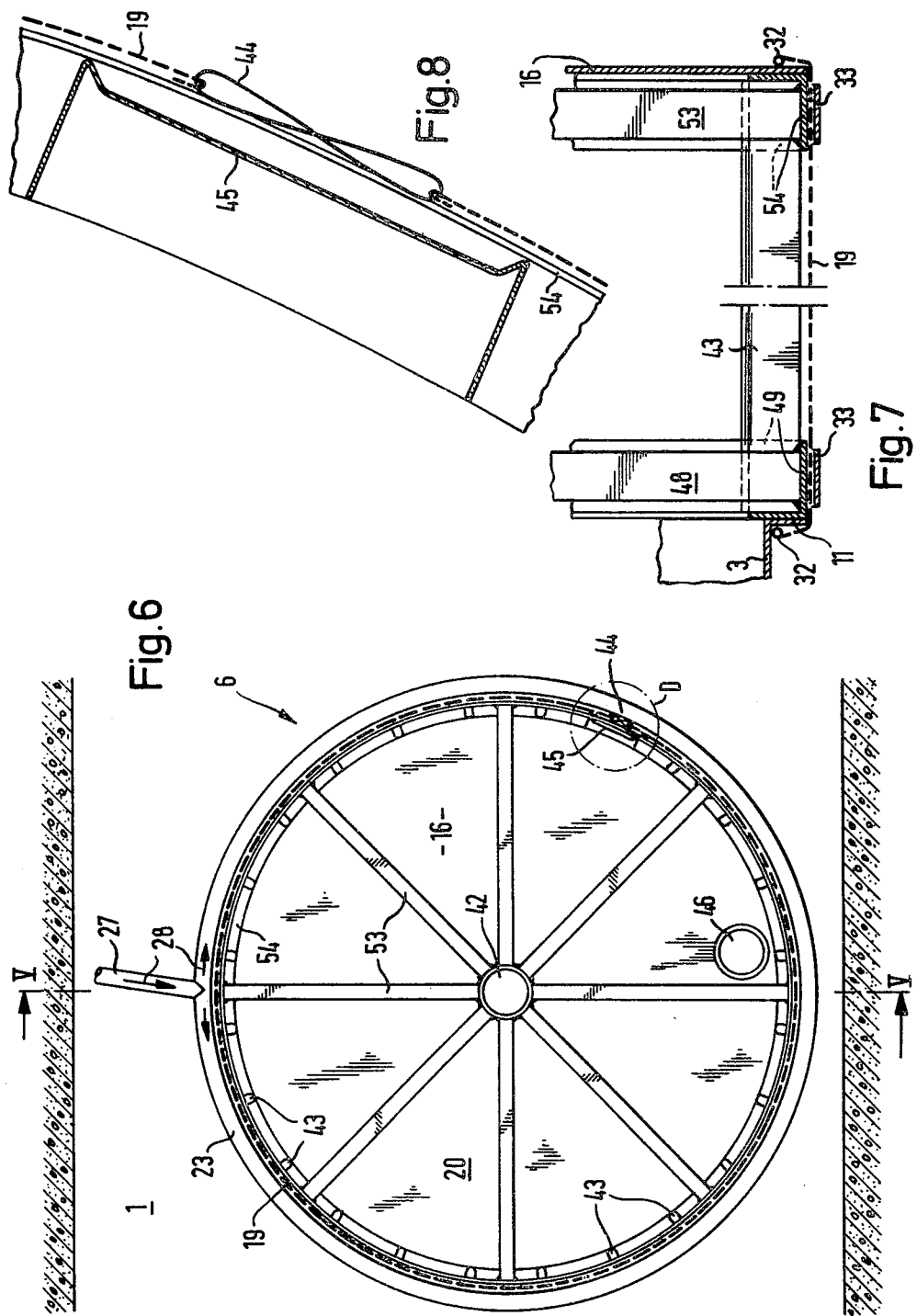

4,209,311

FILTER FOR LARGE GAS QUANTITIES

BACKGROUND OF THE INVENTION

The present invention relates to a new and improved construction of filter for the filtration of large quantities of contaminated gases.

In particular, the filter of the present development is of the type wherein the gas to be cleaned is passed through a filter medium which is spanned onto a drum, the retained contaminants being removed by a device which wipingly passes over the filter medium. In the context of the disclosure of the present invention, under the term "large" throughput quantities of the gas through the filter there is intended a quantity of gas amounting to at least approximately 7000 m³/h, in particular between 20,000 m³/h to 170,000 m³/h, whereas the retained contaminants comprise dust having a grain size which is preferably greater than 1 μm and every type of fiber material.

Filters of the previously mentioned type particularly serve for the purification of exhaust air emanating from textile plants or other industries, for instance the asbestos and tobacco industries. Owing to the extremely large throughput quantities such type filters heretofore were designed in a manner that the contaminated gases, for instance including the exhaust air of the aforementioned industrial plants, were fed into a relatively large volume chamber or compartment in which there is arranged forwardly of an air outlet of such chamber at least one rotatable drum filter. The air to be cleaned passes through this filter from the outside towards the inside, the separated material being deposited upon the filter medium. This filter medium generally is in the form of a textile fabric and bears upon a support grid. The separated material either drops off of the rotating drum, due to the force of gravity, or is removed by a vacuum cleaner for the purpose of cleaning the filter medium. The vacuum cleaner periodically wipingly passes over the filter medium which forms the outer surface of the drum. The drawn-off material deposits in the chamber or compartment surrounding the filter. This heretofore known construction of such type filter is prone to disturbances and its design and maintenance are complicated, since, for instance, there are required drive elements both for the rotating drum and also for accomplishing the wiping movement of the vacuum cleaner over the filter surface. Additionally, it is periodically necessary to collect and remove the contaminants which have been distributively deposited throughout the entire chamber or compartment.

SUMMARY OF THE INVENTION

Hence, with the foregoing in mind it is a primary object of the present invention to provide a new and improved construction of gas filter which is not associated with the aforementioned drawbacks and limitations of the prior art proposals.

Another and more specific object of the present invention aims at constructing a filter of the previously mentioned type in a manner such that its design is simplified, the cleaning effect of the device which wipingly passes over the filter medium is improved, and further, collection and withdrawal of the separated material removed from the filter medium is facilitated.

Yet a further significant object of the present invention aims at the provision of a new and improved construction of filter for large throughput of gases, which is relatively simple in construction and design, economical to manufacture, extremely reliable in operation, not readily subject to breakdown or malfunction, and requires a minimum of maintenance and servicing.

Now in order to implement these and still further objects of the invention, which will become more readily apparent as the description proceeds, the filter construction of the present development is manifested by the features that the drum is fixedly or rigidly connected with a conduit or line through which there is conducted the contaminated gas. A compressed or pressurized gas-blast device, equipped with at least one jet nozzle, movable over at least part of the outer surface of the drum, surrounds the drum in a peripheral direction, and the jet nozzle is directed towards the surface of the filter medium. Means serve for the withdrawal of separated contaminants out of the internal hollow space or chamber of the drum.

With the novel construction of filter there is no longer needed any rotation of the filter drum, because the filter medium is cleaned by a device which is simultaneously effective at the entire, or at the very least at the circumference of the filter drum serving as the filter surface. Therefore, with the novel filter of the invention there is only required a movement of the blast device over the height of the outer surface of the filter. Additionally, as is well known cleaning by a blasting action is appreciably more effective than a suction action.

The fact that the filter drum is stationary enables such to be directly connected at the infeed channel for the contaminated gas. Consequently, it is possible for the separated contaminants to be maintained entrapped internally of the drum and to avoid contamination of the entire chamber which previously was the case with filters of this type.

Although the circular cylindrical configuration constitutes a preferred shape for the drum, of course other constructions are possible, such as drums having square, rectangular, elliptical or polygonal cross-section. Moreover, the novel filter can be beneficially arranged both at the pressure side and the suction side of the conveyor device which produces the gas flow for the contaminated gases.

Advantageously, the filter medium can be designed as a fur fabric wherein the fur-like arranged fibers are directed towards the interior of the drum. Such type fabric affords a good filter effect and, with the aforementioned direction of the "fur fibers", can be easily cleaned by the pressurized or compressed gas which emanates from the jet nozzles.

Although the filter medium preferably composed of a textile fabric is capable of being supported, as was heretofore the case, by a support grid or network at its filter surface, there is realized a simple and less complicated construction of the filter if the filter medium is spanned as a self-supporting structure as the outer or jacket surface of the drum. The spanning or tensioning elements can be effective either in the direction of the drum axis or in the direction of the periphery of the drum. A filter containing axially spanned filter medium can be constructionally advantageously realized, by way of example, if the drum consists of a central tube or pipe which at the connection side for the gas line or conduit carries a clamping or tensioning ring fixedly connected therewith, the clamping ring being reinforced by means of struts, and at the opposite end of the drum there is mounted a movable clamping or tensioning ring having a drum floor or base. The movable clamping ring can be axially shifted by means of a tensioning or tightening device upon the central tube and towards the fixed clamping or tensioning ring.

The effectiveness of the blast device for cleaning of the filter medium can be enhanced if the inner width of the blasting or blast device at most is approximately equal to that of the filter medium spanned on the drum, i.e., if the filter medium bears at the blast device, which as to its cross-sectional configuration is accommodated at least approximately to the shape of the drum.

For the withdrawal of the separated contaminanats out of the internal hollow space or chamber of the filter and which contaminants have been blown off of the filter medium there can be advantageously provided filter bags or sacks. Through such filter bags or sacks there can flow a partial stream of the gas flowing out of the internal hollow space of the filter, this partial stream flowing for instance essentially parallel to the cleaned gas stream and being formed by the relative flow resistance. This partial stream or partial gas flow can be, however, also produced by a suction ventilator or fan or equivalent structure. It is equally however possible to directly draw-off this highly contaminated partial stream with the aid of a ventilator without any filter sack or bag and to conduct such into a suitable cleaning device. Moreover, it is possible to undertake the withdrawal of the contaminants, if desired alone, by the action of the force of gravity at the base region of the drum and for this purpose to arrange, under certain circumstances, a mechanical transport device which travels for instance along a generatrix of the drum.

BRIEF DESCRIPTION OF THE DRAWINGS

The invention will be better understood and objects other than those set forth above, will become apparent when consideration is given to the following detailed description thereof. Such description makes reference to the annexed drawings wherein:

FIG. 2 is a cross-sectional view of the filter arrangement of FIG. 1, taken subsantially along the line II—II;

FIG. 3 illustrates a detail of the arrangement of FIG. 1 at the region within the circle labeled A;

FIG. 4 illustrates a detail of the arrangement of FIG. 1 at the region within the circle labeled B;

FIG. 5 is a sectional view, similar to the showing of FIG. 1, of a further embodiment of filter constructed according to the invention, the sectional view being taken substantially along the line V—V of FIG. 6;

FIG. 6 is a sectional view, like the showing of FIG. 2, taken substantially along the line VI—VI of FIG. 5;

FIG. 7 is an enlarged detail of the filter arrangement of FIG. 5 at the region labeled C; and FIG. 8 likewise is an enlarged detail of the filter arrangement shown in FIG. 6 at the region labeled D.

DETAILED DESCRIPTION OF THE PREFERRED EMBODIMENTS

Figure 1:
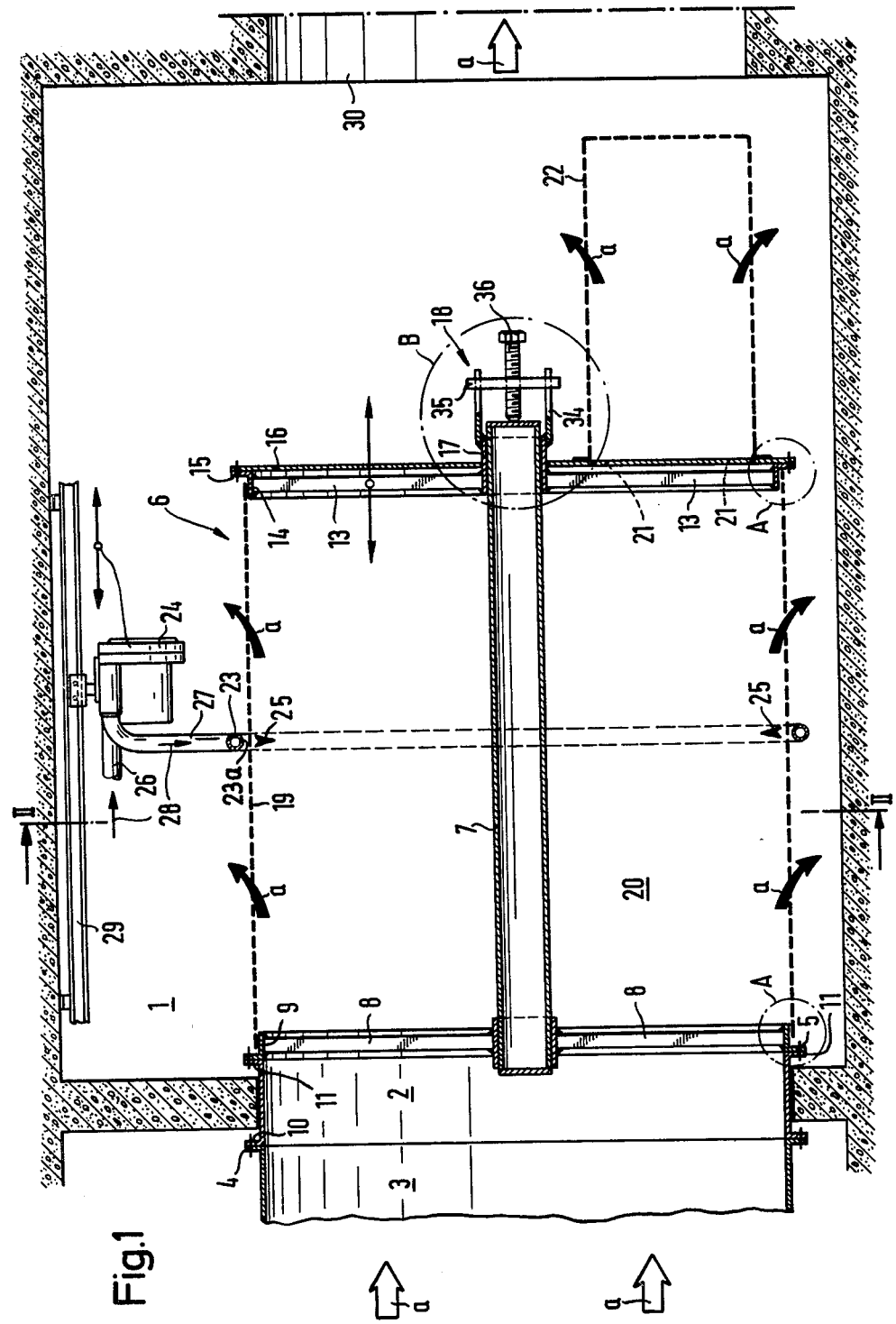
FIG. 1 schematically illustrates one of the aforementioned filter chambers or compartments in which there has been mounted the novel filter shown in sectional view taken substantially along the line I—I of FIG. 2.

Describing now the drawings, in conventional manner there is fixedly anchored in a side wall of a filter chamber or compartment 1, as best seen by referring to FIG. 1, a connection ring 2, formed typically for instance of sheet metal. The connection ring 2 is provided at its ends with the flanges 10 and 11. At the flange 10 there is secured by means of not particularly illustrated threaded bolts or equivalent fastening devices, as viewed from the left side of the showing of FIG. 1, a conduit or line 3 by means of its flange 4. In this conduit 3 there flow the contaminated gases, in other words for instance, exhaust air which is permeated with dust and fiber material and emanating from a textile plant, these contaminated gases flowing towards the filter chamber of compartment 1, the flow direction of the air being generally indicated by the arrows a.

Rigidly connected by means of the flanges 5 and 11 with the ring 2 within the compartment 1 is the novel filter of the present invention, generally indicated by reference character 6 in FIG. 1. With the first exemplary embodiment of such filter 6 the same will be seen to comprise a central pipe or tube 7 upon which there is held at the left open end thereof by means of the struts 8 or equivalent devices a tensioning or clamping ring 9. This clamping or tensioning ring 9 is connected with the flange 5 which is threaded or otherwise suitably connected with the flange 11 of the ring 2.

At its other downstream end the central tube or pipe 7 supports a constructionally similar ring 14 which is reinforced by means of struts 13, the end flange of ring 14 being designated by reference character 15. Upon the ring 14 there is threaded or otherwise suitably connected from the outside a base or floor 16. The ring 14 and the base or floor 16 are seated upon a sleeve 17 which is axially displaceable upon the central tube or pipe 7 with the aid of a clamping or tensioning device 18. The tensioning device 18, when properly tightened, serves to cause the fabric which comprises the filter medium 19 to span the rings 9 and 14 so as to form the outer surface of the drum 20.

Between the rings 9 and 14 there is spanned a fabric which is self-supporting and serving as the filter medium 19, which fabric, as already mentioned, preferably comprises a fur fabric, whose "fur" is directed towards the interior of the not particularly referenced internal hollow space or compartment of the filter drum 20 which is formed from the rings 9 and 14 and the central tube 7.

The floor or base 16 which is composed of a cover plate formed, typically for instance of sheet metal, will be seen to contain two openings 21, as shown in FIG. 2, at which there can be connected, with this embodiment, a respective filter bag or sack 22 or equivalent structure.

The outer surface of the drum 20 which is formed by the filter cloth or fabric 19 is surrounded by a blast or blasting device 23 for compressed air and which is equipped with jet nozzles, merely generally indicated by reference character 23a which also can be grouped together into a blast slot. The blast direction for the compressed air has been indicated by the small arrows 25. The inner width —assuming in the present case under discussion a cylindrical drum, in other words the inner diameter—of the blast device 23 closes as tightly as possible the filter cloth or fabric 19, so that such even possibly bears upon the blast device 23. In the exemplary embodiment the compressed air is produced in a conventional ring compressor 24 which draws up air out of the compartment or chamber 1 by means of a line or conduit 26 and infeeds such by means of a line or conduit 27 to the ring-shaped or annular blast device 23, as indicated by the arrow 28.

By means of a not particularly illustrated but conventional drive the compressor 24 which is suspended on a rail 29 together with the blast device 23 is movable in the axial direction of the filter drum 20, reversal of the direction of movement of the arrangement being accomplished for instance by not particularly illustrated, standard terminal switches. The blast device 23 can thus, in this manner, periodically wipingly pass over the so-to-speak "filter surface" forming the outer surface or jacket of the drum 20 and thus cleans such by a blast action i.e., blowing-off the contaminants. Of course, it is also possible to connect the blast device 23 with a central compressed air supply.

In the wall which is situated opposite the aforementioned side wall of the chamber or compartment 1 there is located an air outlet or exit opening 30 which leads to the surroundings or can be connected with a not particularly illustrated air conduit or line corresponding to the line or conduit 3.

For the attachment of the filter cloth or fabric 19, the ends 32 of which have been folded over into a seam and through which there can be drawn a cord or band, the rings 9 and 14 each have two stiffening corrugations or pleats 31. The ends of the filter cloth 19, are drawn, during the attachment of the filter cloth, over both of the corrugations or pleats 31 of each ring, thereafter the cord or string located in such ends is tightly drawn. Thereafter, in the recess or depression 31a of the rings 9 and 14 formed between the corrugations or pleats 31 there is inserted a tensioning band 33, as the same for instance is known for closing boxes or packages, and such tensioning band or strap is then tightened, so that the filter cloth 19 is pressed as extensively as possible in an airtight fashion against the rings 9 and 14, respectively.

As best seen by referring to FIG. 4, the clamping or tensioning device 18 which is effective with the heretofore described construction in the direction of the lengthwise axis of the drum consists in a simple manner of two guide rods 34 which are welded at the sleeve 17. These guide rods 34 are interconnected by a transverse web 35, at the center of which there is arranged a threaded spindle 36. This threaded spindle 36 bears upon the central pipe or tube 7 which is closed at its ends by means of a respective coverplate 37 formed of sheet metal for instance, spindle 36 is constructed to have a multi-edge configuration 36a at its free end for the reception of a suitable tightening tool or the like.

The mode of operation of the novel filter described above will now be considered and is as follows:

The exhaust gas, symbolized in its flow by the arrows a, in the line or conduit 3, is conveyed by means of a not particularly illustrated ventilator or fan through the filter 6. This standard ventilator or fan can either be located in the conduit 3, so that the filter 6 is located at its pressure side, or can be arranged in the flow direction behind the chamber or compartment 1. The contaminated air thus initially moves out of the conduit 3 into the drum 20 and escapes out of such drum 20 through the filter cloth or fabric 19 into the chamber 1, leaving the latter by means of the opening or exit 30. In the filter cloth or fabric 19 the contaminants are retained up to the desired grain size, so that only cleaned air fills the chamber or compartment 1.

The contaminants which are entrapped by the filter cloth or fabric 19 are blown out of such filter cloth by the pronounced air jets of the blast device 23 and arrive within the internal space or chamber of the drum 20. The cleaning of the filter cloth 19 due to the to-and-fro moving blast device 23 can be accomplished either continuously or by performing an intermittent mode of operation. Furthermore, it is possible with intermittent cleaning of the filter cloth 19 to stop the primary air flow if desired.

In accordance with the prevailing flow resistances the air flows in mutually parallel flow paths through the filter cloth or fabric 19 and the filter sack 22 out of the drum 20. Consequently, there is continuously withdrawn a part of the contaminants contained in the relatively small air quantity and caught in the drum 20 and predominantly floating or suspended therein, this air quantity flowing through the openings 21 into the filter bags or sacks 22. In order to increase the effect of the withdrawal of such contaminants out of the drum 20 the openings 21 are provided as closely as possible to the lowest point of the drum 20. If the flow resistance in the filter bags or sacks 22, during the course of operation becomes too great, then the filter sacks are replaced by new empty sacks or bags, either at regular time intervals or whenever the need arises.

If desired, it is possible to improve the withdrawal of the contaminants from the drum 20 by a suction ventilator, to which end each filter sack 22 is surrounded by a housing at which there can be connected a not particularly illustrated suction ventilator at its suction side.

Now in FIGS. 5 and 6 there is shown an appreciable structural modification of the filter in relation to the embodiment of FIGS. 1 to 4, wherein for the second embodiment of filter 6 the filter medium or cloth or fabric 19 is not spanned in axial direction of the filter drum 20, rather in its peripheral direction. The filter drum 20, upon which bears the filter cloth or fabric 19 constituting the filter medium, in this embodiment consists of two angle profile members each of which are flexed so as to form a ring 49 and 54 (FIGS. 5 and 6) and which are supported by spoke-like struts 48 and 53, respectively, as best seen by referring to FIG. 6. These spokes or spoke-like struts 48 and 53 merge inwardly with a respective hub 41 and 42.

For the support of the filter cloth or fabric 19 there are provided at the periphery of the rings 49 and 54 distributed longitudinal struts 43 or equivalent structure which are threaded with such rings.

Along a generatrix of the drum 20, with this modified embodiment, the filter cloth 19 is cut and at both ends of the cutting or separation line is provided with not particularly shown eyelets by means of which there can be drawn in a zig-zag configuration a clamping or tightening cord 44 or other suitable tightening element. At the region of such clamping or tightening device there is threaded, instead of one of the aforementioned longitudinal struts 43, a cover plate 45, for instance formed of sheet metal, at the rings 49 and 50, for closing the interior of the drum at the region of the engaging filter cloth 19 with respect to the chamber or compartment 1, as best seen by referring to FIG. 8.

As particularly well recognized with reference to FIG. 7, the folded over ends 32 of the filter cloth or fabric 19 are guided about the angle rings 49 and 54 as well as about the flange 11 of the ring 2 and about the floor 16 and are drawn together at the end faces by means of the cords or the like located therein. Furthermore, the filter cloth 19, also with this embodiment, is additionally pressed by the clamping or tightening bands 33 against the rings 49 and 54, in order to provide a seal which is as air-tight as possible at these locations.

Finally, as a modification of the first embodiment utilizing the filter sacks or bags 22 for the removal of the contaminants from the interior of the filter drum 20, with the second exemplary embodiments of filter 6 such filter sacks or bags are replaced by a suction line or conduit 46 connected at the base or floor 16 and in which there is arranged a schematically illustrated, conventional suction ventilator or fan 46a. The latter draws a relatively small, but highly contaminated air quantity out of the drum interior and leads such to a separate cleaning process where, of course, also there can be likewise provided a filter bag or sack.

The guiding of the air, as indicated by the arrows a and the cleaning of the filter medium 19 by the blast device 23 also with the second embodiment of filter 6 as discussed above is accomplished in the manner described in conjunction with the description of the first embodiment considered with respect to FIGS. 1 to 4.

While there are shown and described present preferred embodiments of the invention, it is to be distinctly understood that the invention is not limited thereto, but may be otherwise variously embodied and practiced within the scope of the following claims. Accordingly,

What we claim is:

1. A filter for cleaning large quantities of contaminated gas, comprising:
   a stationary drum having an internal hollow space and a lengthwise axis and having a connection side and a side opposite said connection side;
   said drum comprising a central tube having a fixed clamping ring arranged at one end region thereof at the neighborhood of said connection side and a movable clamping ring having a drum base and being mounted at said opposite side to axial displacement means which is mounted on said central tube and a filter medium spanning said clamping rings and connected thereto and through which the gas to be cleaned passes;
   tensioning means attached to said axial displacement means and being effective in the direction of the lengthwise axis of said drum to cause spanning of said filter medium as a self-supporting structure defining an outer surface of said drum;
   said tensioning means enabling axial displacement of said movable clamping ring with said drum base upon said central tube and with respect to said fixed clamping ring;
   conduit means fixedly connected with said drum and through which there is conducted the contaminated gas to be cleaned;
   said conduit means comprising a gas line connected at the region of said connection side of said drum;
   strut means for reinforcing said fixed clamping ring;
   means for wipingly passing over a filter medium for removing contaminants therefrom;
   said wipingly passing means comprising a compressed gas-blast device equipped with at least one jet nozzle and movable over at least part of the outer surface of the drum and surrounding the periphery of said drum;
   said at least one jet nozzle being directed towards the surface of the filter medium;
   means for the withdrawal of the separated contaminants from the internal hollow space of the drum; and
   said withdrawal means for the contaminants comprising a suction ventilator.

* * * * *